United States Patent
Byun et al.

(10) Patent No.: US 9,088,944 B2
(45) Date of Patent: Jul. 21, 2015

(54) METHOD AND DEVICE FOR ENERGY EFFICIENT SIGNAL TRANSMISSION IN MASSIVE MULTI-ANTENNA WIRELESS COMMUNICATION SYSTEM

(71) Applicants: Samsung Electronics Co., Ltd., Suwon-si, Gyeonggi-do (KR); SNU R&DB FOUNDATION, Seoul (KR)

(72) Inventors: YongSuk Byun, Seoul (KR); Taeyoon Kim, Seongnam-si (KR); Yonghwan Lee, Seoul (KR); Jonghan Lim, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 14/310,755

(22) Filed: Jun. 20, 2014

(65) Prior Publication Data

US 2014/0376654 A1   Dec. 25, 2014

Related U.S. Application Data

(60) Provisional application No. 61/837,898, filed on Jun. 21, 2013.

(30) Foreign Application Priority Data

Oct. 8, 2013   (KR) .................. 10-2013-0120132

(51) Int. Cl.
*H04W 52/02*   (2009.01)
*H04B 7/04*   (2006.01)
*H04B 7/06*   (2006.01)

(52) U.S. Cl.
CPC ......... *H04W 52/0206* (2013.01); *H04B 7/0413* (2013.01); *H04B 7/0452* (2013.01); *H04B 7/0689* (2013.01); *H04B 7/0691* (2013.01)

(58) Field of Classification Search
CPC .... H04B 7/0413; H04B 7/0604; H04B 7/061; H04B 7/0617; H04B 7/0408; H04B 7/0689; H04B 7/0691; H04B 7/0693; H04B 7/0452; H04W 52/0206

USPC .......................................... 375/267, 299, 347
See application file for complete search history.

(56) References Cited

U.S. PATENT DOCUMENTS 8,085,721 B2 * 12/2011 Ylitalo .......................... 370/329
8,111,773 B2 *  2/2012 Ryoo et al. ..................... 375/267
2006/0035674 A1 *  2/2006 Karaoguz et al. .......... 455/562.1

(Continued)

FOREIGN PATENT DOCUMENTS

EP   1 655 871 A2   5/2006

OTHER PUBLICATIONS

Sung-Hyun Moon et al., A Joint Adaptive Beamforming and User Scheduling Algorithm for Downlink Network MIMO Systems, In: IEEE ICC 2013—Wireless Communication Symposium, Jun. 9-13, 2013, pp. 5392-5397, ISSN; 1550-3607.

*Primary Examiner* — Leon Flores
(74) *Attorney, Agent, or Firm* — Jefferson IP Law, LLP

(57) ABSTRACT

A method for selecting a Multiple-Input Multiple-Output (MIMO) mode based on energy efficiency and selecting an antenna subset to be used in a communication, in a wireless communication system using a multi-user massive multi-antenna is provided. The method selects an antenna subset capable of minimizing transmission power without using all antennas, based on power consumed by an Radio Frequency (RF) circuit as well as the transmission power. The method further includes selecting a mobile station to which the signal is to be transmitted, selecting a multi-antenna technique based on power consumption of all antennas, selecting an antenna subset to transmit the signal to the mobile station among all the antennas, and transmitting the signal to the mobile station by using the antenna subset.

20 Claims, 5 Drawing Sheets

(56) References Cited

U.S. PATENT DOCUMENTS

2006/0039494 A1 2/2006 Kim et al.
2006/0120477 A1* 6/2006 Shen et al. .................... 375/267
2010/0098184 A1 4/2010 Ryoo et al.
2010/0322336 A1 12/2010 Nabar et al.
2011/0158347 A1* 6/2011 Yeh et al. ...................... 375/296
2012/0009968 A1* 1/2012 Kludt et al. ................... 455/522
2013/0059620 A1 3/2013 Cho
2013/0266085 A1* 10/2013 Sesia et al. .................... 375/295

* cited by examiner

METHOD AND DEVICE FOR ENERGY EFFICIENT SIGNAL TRANSMISSION IN MASSIVE MULTI-ANTENNA WIRELESS COMMUNICATION SYSTEM

CROSS-REFERENCE TO RELATED APPLICATION(S)

This application claims the benefit under 35 U.S.C. §119(e) of a U.S. provisional patent application filed on Jun. 21, 2013 in the U.S. Patent and Trademark Office and assigned Ser. No. 61/837,898, and under 35 U.S.C. §119(a) of a Korean patent application filed on Oct. 8, 2013 in the Korean Intellectual Property Office and assigned Serial number 10-2013-0120132, the entire disclosure of each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) SNU R & DB FOUNDATION.

TECHNICAL FIELD

The present disclosure relates to an apparatus and a method for increasing energy efficiency of a base station in a wireless communication system. More particularly, the present disclosure relates to a signal transmission technique for selecting an antenna mode to increase energy efficiency of a base station, and selecting an antenna subset to transmit signals to a mobile station among all antennas, in a wireless communication system using a multi-user massive multi-antenna.

BACKGROUND

Wireless data traffic has explosively increased due to invigoration of a wireless multimedia service and a Social Networking Service (SNS) according to the spread of smart phone use and the expansion of wireless demands, such as Machine To Machine communication. Accordingly, a big data environment which is not easy to process through data transmission methods of the related art is imminent.

With the advent of the big data environment, a Massive Multiple-Input Multiple-Output (M-MIMO) system is being considered for efficiently managing wireless resources. Further, the M-MIMO system is being spotlighted as an energy efficient green communication technology.

Studies on the wireless communication system of the related art have been focused on the increase in a channel capacity, such as installation of more base stations or securing of a frequency band. For example, technologies of the related art including Orthogonal Frequency Division Multiple Access (OFDMA), a multi-antenna system, and a relay transmission system attempt to provide a high channel capacity.

However, high energy consumption is inevitably required to provide the high channel capacity. Considering that, the method for raising the channel capacity is not efficient for devices with restricted total energy or networks focused on energy efficiency.

Meanwhile, with the advent of the M-MIMO system and the distributed antenna system, it is easier, in recent years, to satisfy transmission requirements of a mobile station based on abundant resources. Accordingly, a wireless communication system is required which is maximally energy efficient and satisfies the transmission requirements of the mobile station.

In the case of transmission techniques of the related art considering energy efficiency, a plurality of antennas are used so that transmission power but not power consumption is considered. However, due to the advent of the M-MIMO system, more power should be consumed to operate so many antennas.

Therefore, a need exists for a signal transmission method for satisfying a user's transmission requirements and improving power efficiency of a base station based on power consumption in a Radio Frequency (RF) circuit as well as transmission power.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a signal transmission method for satisfying a user's transmission requirements and improving power efficiency of a base station based on power consumption in a Radio Frequency (RF) circuit as well as transmission power.

In accordance with an aspect of the present disclosure, a method for transmitting a signal by a base station in wireless communication using a massive multi-antenna technique is provided. The method includes selecting a mobile station to which the signal is to be transmitted, selecting a multi-antenna technique based on power consumption of all antennas, selecting an antenna subset to transmit the signal to the mobile station among all the antennas, and transmitting the signal to the mobile station by using the antenna subset.

The selecting of the multi-antenna technique may include calculating power of all the antennas for each of multi-antenna techniques and selecting a multi-antenna technique requiring less power.

The selecting of the antenna subset may include selecting the antenna subset based on the selected multi-antenna technique and channel gains for the respective antennas or a correlation between the antennas.

In accordance with another aspect of the present disclosure, a base station for transmitting a signal to a mobile station in wireless communication using a massive multi-antenna technique is provided. The base station includes a transmission/reception unit configured to transmit/receive the signal to/from the mobile station, and a controller configured to select a mobile station to which a signal is to be transmitted, to select a multi-antenna technique based on power consumption of all antennas, to select an antenna subset to transmit the signal to the mobile station among all the antennas, and to control the signal to be transmitted to the mobile station by using the antenna subset.

The controller may calculate power of all the antennas for each of multi-antenna techniques and select a multi-antenna technique requiring less power.

The controller may select the antenna subset based on a selected multi-antenna technique, and channel gains for the respective antennas or correlations between the antennas.

As described above, the present disclosure can provide an energy efficient user scheduling method, and has an effect of obtaining an additional gain by selecting an efficient multi-antenna technique.

In addition, according to the present disclosure, power efficiency of the base station can be improved, and at the same time, the number of additionally used antennas is decreased so that complexity can also be decreased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
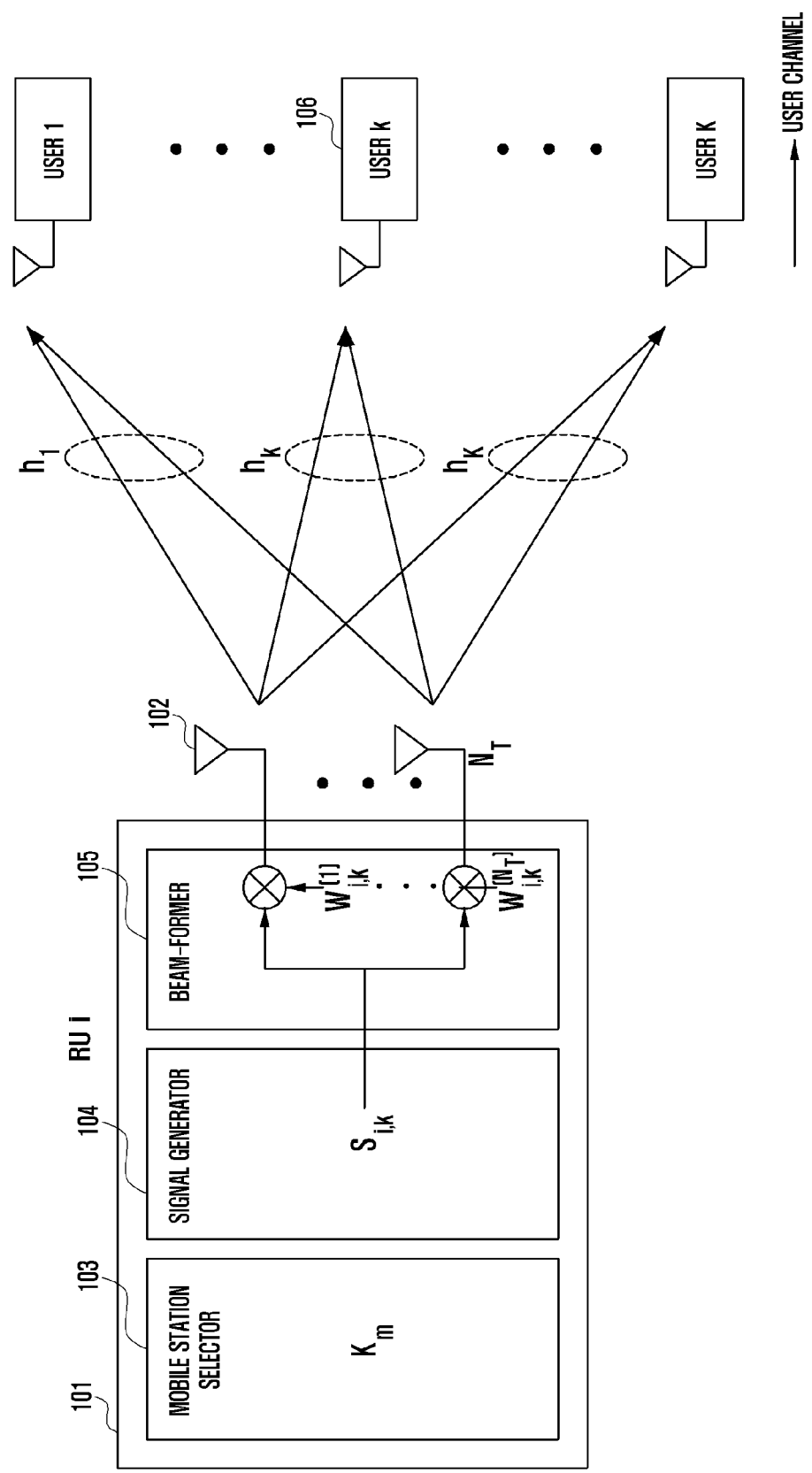
FIG. 1 is a network configuration diagram illustrating a relationship between a base station and mobile stations in an energy efficient signal transmission method according to an embodiment of the present disclosure.

FIG. 1 is a network configuration diagram illustrating a relationship between a base station and mobile stations in an energy efficient signal transmission method according to an embodiment of the present disclosure.

Referring to FIG. 1, it is assumed that a base station 101 uses $N_T$ antennas 102 and there are a total of K mobile stations to which the base station 101 has to transmit a signal. When the base station 101 selects, through a mobile station selector 103, $K_m$ mobile stations to which signals are simultaneously transmitted, the base station 101 forms symbol signals to transmit to the $K_m$ mobile stations by using a signal generator 104, and generates signals to transmit through a beam-former 105, a reception signal of a mobile station (k) 106 receiving a service from the base station 101 may be represented as follows.

$$y_k = \sqrt{\alpha_k P_k}\, h_k w_k s_k + \sum_{l=1, l \neq k}^{K_m} \sqrt{\alpha_k P_k}\, h_m w_l s_l + n_k \qquad \text{Equation 1}$$

Here, $\alpha_k$ denotes a path loss from the base sttation 101 to the mobile station (k) 106, P denotes transmission power transmitted to the mobile station (k) 106 by the base station 101, $h_k$ denotes a ($1 \times N_T$) channel vector from the base station 101 to the mobile station (k) 106, $w_k$ and $s_k$ denote a ($N_T \times 1$) beam weight vector and a transmission signal, respectively, transmitted by the base station 101, and $n_k$ denotes an adaptive white Gaussian noise having an average of 0 and a variable of $\sigma_{n,k}^2$. At this time, total power consumption of the base station may be represented by Equation 2.

$$P = \sum_{k=1}^{K} P_k + P_{RF} N_T = P_T + P_{RF} N_T \qquad \text{Equation 2}$$

Here, $P_{RF}$ denotes power consumption of a Radio Frequency (RF) circuit required by one antenna when the base station transmits a signal.

Figure 2A:
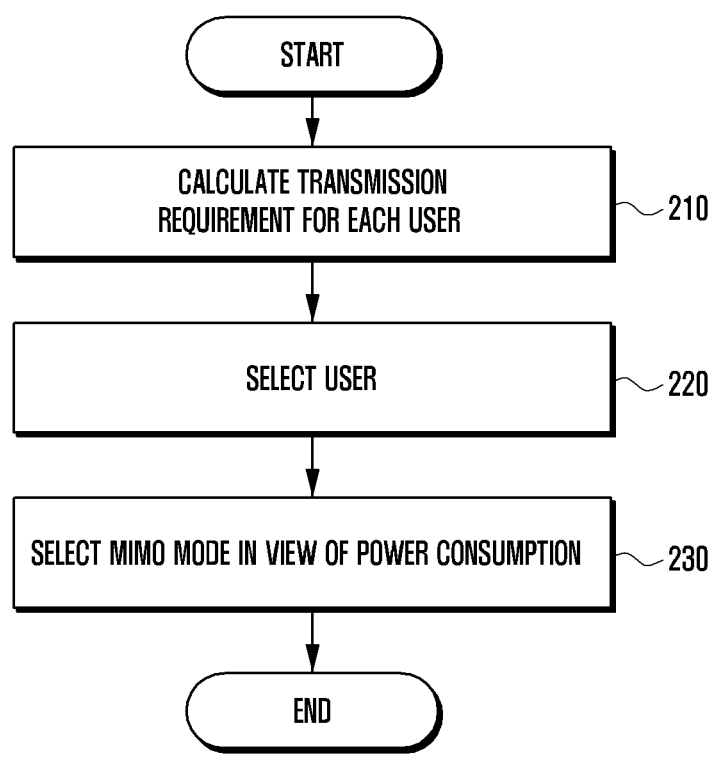
FIG. 2A is a flowchart illustrating an energy efficient signal transmission method according to an embodiment of the present disclosure.

FIG. 2A is a flowchart illustrating an energy efficient signal transmission method according to an embodiment of the present disclosure.

Referring to FIG. 2A, in operation 210, a base station receives, from an upper layer, transmission requirements and transmission signals of k mobile stations requiring data transmission, and calculates the transmission requirements for the respective mobile stations.

In operation 220, the base station may calculate transmission power $P_{o,k}$ required for data transmission through a single antenna based on the transmission requirements and channel environments of the mobile stations. Thereafter, the base station may select the mobile station based on the calculated transmission power.

Thereafter, in operation 230, the base station determines a multi-antenna technique for the selected mobile station. For example, the base station may select a multi-antenna technique consuming less transmission power between Maximal Ratio Transmission (MRT) and Zero-Forcing Beam-Forming (ZFBF).

Figure 2B:
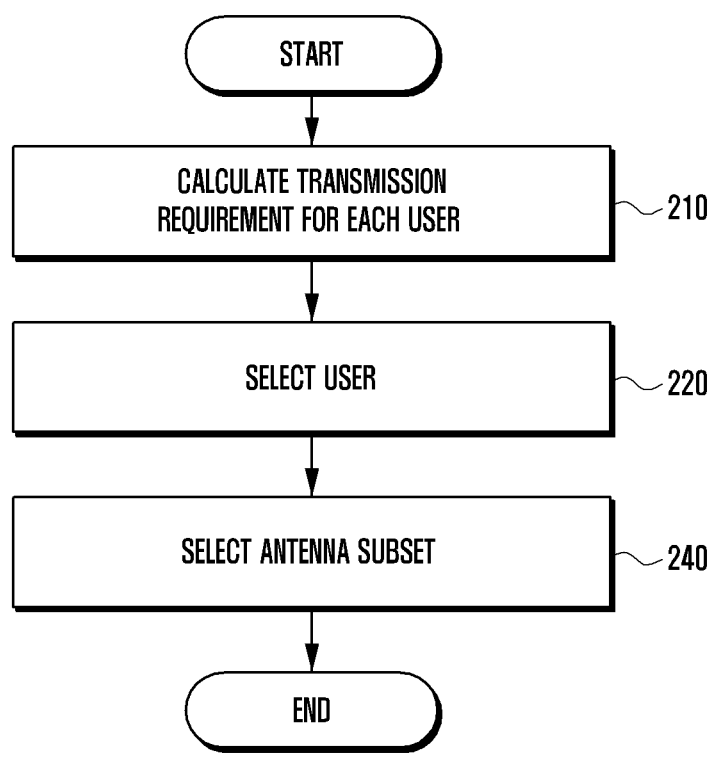
FIG. 2B is a flowchart illustrating an energy efficient signal transmission method according to an embodiment of the present disclosure.

FIG. 2B is a flowchart illustrating an energy efficient signal transmission method according to an embodiment of the present disclosure.

Referring to FIG. 2B, similar to FIG. 2A, a base station may receive, from an upper layer, transmission requirements and transmission signals of k mobile stations requiring data transmission and may calculate the transmission requirements for the respective mobile stations, in operation 210, and may calculate transmission power $P_{o,k}$ required for data transmission through a single antenna based on the transmission requirements and channel environments of the mobile stations and then, may select the mobile station based on the calculated transmission power, in operation 220.

Thereafter, in operation 240, the base station may calculate the number $N_{T,sel}$ of antennas by which the transmission power is minimized when transmission is made through the selected multi-antenna technique, and may select an antenna subset capable of maximizing transmission efficiency among a total of $N_T$ antennas.

Meanwhile, although FIGS. 2A and 2B have been differentiated as separate drawings in the present disclosure, the present disclosure is not limited thereto. Namely, the signal transmission methods of FIGS. 2A and 2B may be understood as a single process. In this case, operation 240 of FIG. 2B may progress after operation 230 of FIG. 2A.

Two methods of selecting an antenna may be largely exemplified. A first method is a method for selecting an antenna through a comparison of channel gains for respective antennas, and a second method is a method for selecting an antenna based on correlations between antennas.

Such a method for selecting the antenna may vary depending on characteristics of the determined Multiple-Input Multiple-Output (MIMO) mode. For example, in a case of selecting an antenna while the MIMO mode is determined as MRT, a performance is considerably enhanced with an increasing channel gain, so that it is appropriate to select an antenna having a large channel gain through a comparison of channel gains for respective antennas.

As another example, in a case of selecting an antenna while the MIMO mode is determined as ZFBF, a performance is enhanced with an increasing rank of a channel matrix and the rank is increased with decreasing correlations between antennas, so that it is appropriate to select an antenna having the lowest correlation between the antennas.

In a case of Eigen Beam-Forming (EBF) as another MIMO technique, a performance gain is large with an increasing channel correlation and thus, a determined number of contiguous antennas may be selected such that the highest correlation between antennas may be obtained.

Figure 3:
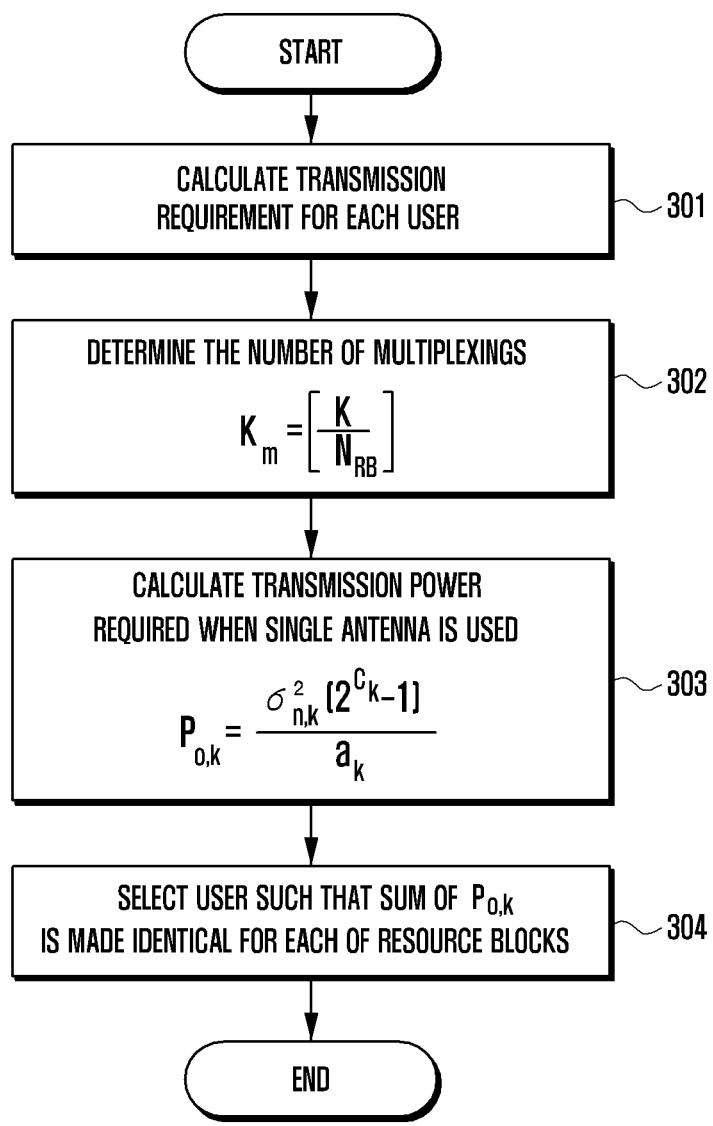
FIG. 3 is a flowchart illustrating a process of selecting a user in an energy efficient signal transmission method according to an embodiment of the present disclosure.

FIG. 3 is a flowchart illustrating a process of selecting a user in an energy efficient signal transmission method according to an embodiment of the present disclosure.

Referring to FIG. 3, in operation 301, a base station receives transmission requirements and transmission signals of all mobile stations from an upper layer. Here, when frequency efficiency required by a mobile station k is $C_k$, transmission power required when transmission is made to the mobile station k may be calculated according to the number of multiplexings and the number of selected antennas. As an example, when the base station determines a multi-antenna technique as ZFBF, transmission power required when transmission is made to the mobile station k may be represented by Equation 3.

$$P_k = \frac{N_0(2^{C_k} - 1)}{\alpha_k(N_{T,sel} - K_m + 1)} \qquad \text{Equation 3}$$
$$= \frac{P_{o,k}}{(N_{T,sel} - K_m + 1)}$$

Thus, total power consumption may be represented by Equation 4 when the base station transmits signals through $N_{T,sel}$ antennas.

$$P = \sum_{k=1}^{K_m} \frac{\sigma_{n,k}^2(2^{C_k} - 1)}{\alpha_k(N_{T,sel} - K_m + 1)} + P_{RF}N_{T,sel} + P_{idle}(N_T - N_{T,sel}) \qquad \text{Equation 4}$$
$$= \frac{1}{(N_{T,sel} - K_m + 1)} \sum_{k=1}^{K_m} P_{o,k} + P_{RF}N_{T,sel} + P_{idle}(N_T - N_{T,sel})$$

Since $K_m \le N_{T,sel}$, Equation 4 is a function that increases according to the number of multiplexings $K_m$. Accordingly, it can be seen that power consumption decreases as the number of multiplexings decreases, and it can be identified that a mobile station should be selected based on transmission power $P_{o,k}$ required when the base station transmits a signal to the mobile station k by using a single antenna.

Thus, in operation 302, the number of multiplexings which the base station should transmit through one resource block is determined. As an example, when the base station has $N_{RB}$ resource blocks, the number of multiplexings for minimizing the number of multiplexings in all the resource blocks may be represented by Equation 5.

$$K_m = \left\lceil \frac{K}{N_{RB}} \right\rceil \qquad \text{Equation 5}$$

In operation 303, the transmission power $P_{o,k}$ required when the base station transmits a signal to the mobile station k by using a single antenna is calculated and may be represented by Equation 6.

$$P_{o,k} = \frac{\sigma_{n,k}^2(2^{C_k} - 1)}{\alpha_k} \qquad \text{Equation 6}$$

In operation 304, mobile stations are selected such that a sum of $P_{o,k}$ for $K_m$ mobile stations to which transmission is simultaneously made through one resource block is made identical for each of the resource blocks.

Figure 4:
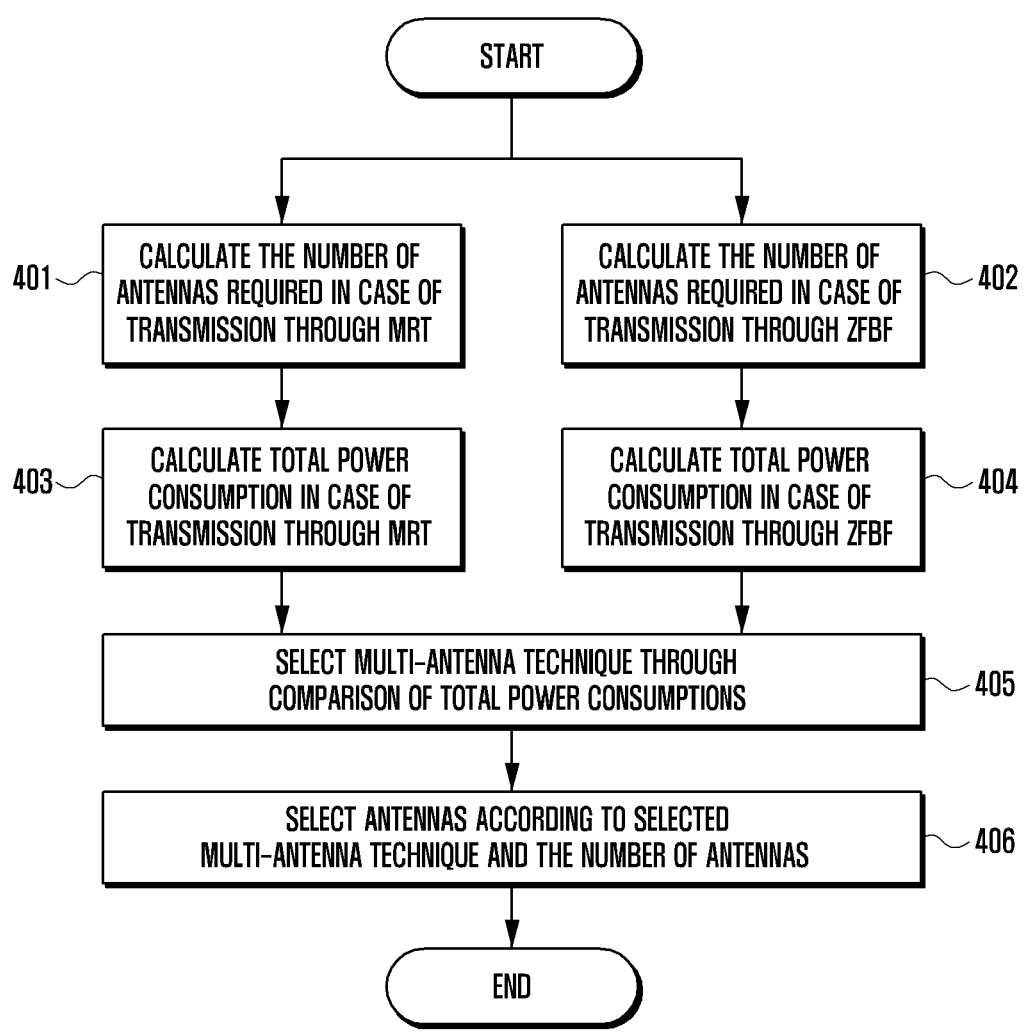
FIG. 4 is a flowchart illustrating a process of selecting an antenna subset according to antenna techniques in an energy efficient signal transmission method according to an embodiment of the present disclosure.

FIG. 4 is a flowchart illustrating a process of selecting an antenna subset according to antenna techniques in an energy efficient signal transmission method according to an embodiment of the present disclosure.

Referring to FIG. 4, it illustrates a process of determining a multi-antenna technique (MRT, ZFBF) and selecting an antenna in a wireless communication system to which energy efficient terminal selection and antenna selection techniques proposed by the present disclosure are applied, and expansion to another multi-antenna technique may be easily described. In operations 401 and 402, the number of antennas required for respective multi-antenna techniques is calculated, and the number of antennas required when transmission is made through MRT may be represented by Equation 7.

$$N_{T,sel}^{(MRT)} = \left\lceil \sqrt{\frac{\sum_{k=1}^{K_m}(P_{o,k} + P_{i,k})}{P_{cir} - P_{idle}}} \right\rceil \qquad \text{Equation 7}$$

Here, $P_{i,k}$ denotes transmission power additionally required by interferences between multiple beams and may be represented by Equation 8.

$$P_{i,k} = (2^{C_k} - 1)\sum_{l=1, l\neq k}^{K_m} P_l \qquad \text{Equation 8}$$

The number of antennas required when transmission is made through ZFBF may be represented by Equation 9.

$$N_{T,sel}^{(ZFBF)} = \left\lceil \sqrt{\frac{\sum_{k=1}^{K_m} P_{o,k}}{P_{cir} - P_{idle}}} + K_m - 1 \right\rceil \qquad \text{Equation 9}$$

In operation 403, total power consumption required by the base station when signals are transmitted through MRT is calculated, and in operation 404, total power consumption required by the base station when signals are transmitted through ZFBF is calculated. In the case of transmission through MRT, the total power consumption may be represented by Equation 10.

$$P^{(MRT)} = \sum_{k=1}^{K_m} \frac{\left(\sum_{l=1,l\neq k}^{K_m} \alpha_k P_l + \sigma_{n,k}^2\right)(2^{C_k} - 1)}{\alpha_k N_{T,sel}^{(MRT)}} + P_{RF} N_{T,sel}^{(MRT)} + \\ P_{idle}(N_T - N_{T,sel}^{(MRT)}) \\ = \frac{1}{N_{T,sel}^{(MRT)}} \sum_{k=1}^{K_m} (P_{i,k} + P_{o,k}) + P_{RF} N_{T,sel}^{(MRT)} + \\ P_{idle}(N_T - N_{T,sel}^{(MRT)}) \qquad \text{Equation 10}$$

In the case of transmission through ZFBF, the total power consumption may be represented by Equation 11.

$$P^{(ZFBF)} = \frac{1}{(N_{T,sel}^{(ZFBF)} - K_m + 1)}\sum_{k=1}^{K_m} P_{o,k} + \\ P_{RF} N_{T,sel}^{(ZFBF)} + P_{idle}(N_T - N_{T,sel}^{(ZFBF)}) \qquad \text{Equation 11}$$

In operation 405, the multi-antenna technique requiring less power is determined through a comparison of the required power for respective multi-antenna techniques which has been calculated in operations 403 and 404. In operation 406, antennas are selected based on the determined multi-antenna technique and the number of antennas. As an example, when MRT is selected among the multi-antenna techniques, antennas are selected in a descending order of a channel gain such that a beam-forming gain of MRT can be maximized, and as another example, when ZFBF is selected among the multi-antenna techniques, antennas are selected such that a rank of multiple mobile station channels is maximized.

Thereafter, the base station may select antennas based on the determined MIMO mode and the number of antennas according to the MIMO mode, among antennas retained by the base station.

Two methods of selecting the antennas may be largely exemplified. A first method is a method for selecting antennas through a comparison of channel gains for respective antennas, and a second method is a method for selecting antennas based on correlations between antennas.

Such a method for selecting the antennas may vary depending on characteristics of the determined MIMO mode. For example, in a case of selecting the antennas while the MIMO mode is determined as MRT, a performance is considerably enhanced with an increasing channel gain and thus, it is appropriate to select antennas having a large channel gain through a comparison of channel gains for respective antennas.

As another example, in a case of selecting the antennas while the MIMO mode is determined as ZFBF, a performance is enhanced with an increasing rank of a channel matrix and the rank increases with decreasing correlations between antennas, so that it is appropriate to select antennas having the lowest correlation between the antennas.

In a case of EBF as another MIMO technique, a performance gain is large with an increasing channel correlation and thus, a determined number of contiguous antennas may be selected such that the highest correlation between antennas may be obtained.

While the present disclosure has been shown and described with reference to various embodiments thereof, it will be understood by those skilled in the art that various changes in form and details may be made therein without departing from the spirit and spirit of the present disclosure as defined by the appended claims and their equivalents.

What is claimed is:

1. A method for transmitting a signal by a base station in wireless communication, the method comprising:
    selecting a mobile station to which the signal is to be transmitted;
    determining a multi-antenna technique, for the mobile station, requiring a minimum transmission power;
    determining selection criteria of an antenna between channel gains for the respective antennas and correlations between the antennas based on characteristics of the determined multi-antenna technique;
    selecting an antenna subset to transmit the signal to the mobile station among all antennas based on the determined selection criteria; and
    transmitting the signal to the mobile station, by using the selected multi-antenna technique, via the selected antenna subset.

2. The method of claim 1, wherein the selected multi-antenna technique comprises at least one of Maximal Ratio Transmission (MRT), Zero-Forcing Beam-Forming (ZFBF) and Eigen beamforming (EBF).

3. The method of claim 1, wherein the selecting of the antenna subset comprises:
    selecting antennas having a large channel gain as the antenna subset when the multi-antenna technique is determined as Maximal Ratio Transmission (MRT).

4. The method of claim 1, wherein the selecting of the antenna subset comprises:

selecting antennas having the lowest correlation between the antennas as the antenna subset when the multi-antenna technique is determined as Zero-Forcing Beam-Forming (ZFBF).

5. The method of claim 1, wherein the selecting of the antenna subset comprises:
   selecting antennas having the highest correlation between the antennas as the antenna subset when the multi-antenna technique is determined as EBF.

6. A method for transmitting a signal by a base station in wireless communication the method comprising:
   selecting a mobile station to which the signal is to be transmitted;
   calculating a total power consumption of each of multi-antenna techniques;
   selecting a multi-antenna technique requiring a minimum power consumption
   determining selection criteria of an antenna between channel gains for the respective antennas and a rank of multiple mobile station channels based on characteristics of the determined multi-antenna technique;
   selecting an antenna subset to transmit the signal to the mobile station among all antennas based on the determined selection criteria; and
   transmitting the signal to the mobile station, by using the selected multi-antenna technique, via the selected antenna subset.

7. The method of claim 6, wherein the calculating of the total power consumption of each of the multi-antenna techniques comprises:
   calculating a number of antennas for each of the multi-antenna techniques,
   wherein the total power consumption of each of multi-antenna techniques are calculated based on the number of antennas for each of the multi-antenna techniques.

8. The method of claim 6, wherein the selecting of the antenna subset comprises:
   selecting antennas having a large channel gain as the antenna subset when the multi-antenna technique is determined as MRT.

9. The method of claim 6, wherein the selecting of the antenna subset comprises:
   selecting antennas having the lowest correlation between the antennas as the antenna subset when the multi-antenna technique is determined as ZFBF.

10. The method of claim 6, wherein the selecting of the antenna subset comprises:
    selecting antennas having the highest correlation between the antennas as the antenna subset when the multi-antenna technique is determined as EBF.

11. A base station for transmitting a signal to a mobile station in wireless communication, the base station comprising:
    a transmission/reception unit configured to transmit/receive the signal to/from the mobile station; and
    a controller configured to select a mobile station to which a signal is to be transmitted, to determine a multi-antenna technique, for the mobile station, requiring a minimum transmission power, to determine selection criteria of an antenna between channel gains for the respective antennas and correlations between the antennas based on characteristics of the determined multi-antenna technique, to select an antenna subset to transmit the signal to the mobile station among all antennas based on the determined selection criteria, and to control the signal to be transmitted to the mobile station by using, the selected multi-antenna technique, via the selected antenna subset.

12. The base station of claim 11, wherein the selected multi-antenna technique comprises at least one of Maximal Ratio Transmission (MRT), Zero-Forcing Beam-Forming (ZFBF) and Eigen beamforming (EBF).

13. The base station of claim 11, wherein the controller is further configured to select antennas having a large channel gain as the antenna subset when the multi-antenna technique is determined as Maximal Ratio Transmission (MRT).

14. The base station of claim 11, wherein the base station is further configured to select antennas having the lowest correlation between the antennas as the antenna subset when the multi-antenna technique is determined as Zero-Forcing Beam-Forming (ZFBF).

15. The base station of claim 11, wherein the controller is further configured to calculate a number of antennas for each of the multi-antenna techniques,
    wherein the total power consumption of each of multi-antenna techniques are calculated based on the number of antennas for each of the multi-antenna techniques.

16. A base station for transmitting a signal to a mobile station in wireless communication, the base station comprising:
    a transmission/reception unit configured to transmit/receive the signal to/from the mobile station; and
    a controller configured to select a mobile station to which a signal is to be transmitted, to calculate a total power consumption of each of multi-antenna techniques, to select a multi-antenna technique requiring a minimum power consumption, to determine selection criteria of an antenna between channel gains for the respective antennas and a rank of multiple mobile station channels based on characteristics of the determined multi-antenna technique, to select an antenna subset to transmit the signal to the mobile station among all antennas based on the determined selection criteria, and to control the signal to be transmitted to the mobile station, by using the selected multi-antenna technique, via the selected antenna subset.

17. The base station of claim 7, wherein the selecting of the antenna subset comprises:
    selecting antennas having the highest correlation between the antennas as the antenna subset when the multi-antenna technique is determined as EBF.

18. The base station of claim 16, wherein the controller is further configured to select antennas having a large channel gain as the antenna subset when the multi-antenna technique is determined as MRT.

19. The base station of claim 16, wherein the base station is further configured to select antennas having the lowest correlation between the antennas as the antenna subset when the multi-antenna technique is determined as ZFBF.

20. The base station of claim 16, wherein the base station is further configured to select antennas having the highest correlation between the antennas as the antenna subset when the multi-antenna technique is determined as EBF.

* * * * *